(12) United States Patent
Sieh et al.

(10) Patent No.: US 7,802,471 B2
(45) Date of Patent: Sep. 28, 2010

(54) LIQUID LEVEL SENSING DEVICE AND METHOD

(76) Inventors: Philip J. Sieh, 2450 W. Pecos Rd., #1118, Chandler, AZ (US) 85224; Robert L. Johnson, 16710 E. Yaqui Cir., Fountain Hills, AZ (US) 85268; Bryce T. Osoinach, 4413 E. Dry Creek Rd., Phoenix, AZ (US) 85044

(*) Notice: Subject to any disclaimer, the term of this patent is extended or adjusted under 35 U.S.C. 154(b) by 485 days.

(21) Appl. No.: 11/966,103

(22) Filed: Dec. 28, 2007

(65) Prior Publication Data

US 2009/0165552 A1 Jul. 2, 2009

(51) Int. Cl.
*G01F 23/26* (2006.01)
(52) U.S. Cl. .................................. 73/304 C
(58) Field of Classification Search ............... 73/304 C
See application file for complete search history.

(56) References Cited

U.S. PATENT DOCUMENTS

| 4,003,259 | A | * | 1/1977 | Hope | 73/304 C |
|---|---|---|---|---|---|
| 5,726,908 | A | * | 3/1998 | Hosmer et al. | 702/55 |
| 6,016,697 | A | * | 1/2000 | McCulloch et al. | 73/304 C |
| 6,935,173 | B2 | * | 8/2005 | Stehman et al. | 73/304 C |
| 7,114,391 | B2 | * | 10/2006 | Sasaki et al. | 73/304 C |
| 7,432,725 | B2 | * | 10/2008 | Sieh et al. | 324/662 |
| 2004/0129074 | A1 | * | 7/2004 | Rudewicz et al. | 73/295 |
| 2006/0042376 | A1 | * | 3/2006 | Reusche et al. | 73/304 C |
| 2009/0165552 | A1 | * | 7/2009 | Sieh et al. | 73/304 C |

FOREIGN PATENT DOCUMENTS

| JP | 10030950 A | 2/1998 |
|---|---|---|
| JP | 11211537 A | 2/1998 |
| JP | 11281460 A | 10/1999 |
| JP | 11311562 A | 11/1999 |
| WO | 2006026624 A1 | 3/2006 |

OTHER PUBLICATIONS

International Search Report and Written Opinion correlating to PCT/US2008/084624 dated May 20, 2009.
U.S. Appl. No. 11/376,810, filed Mar. 15, 2006.

* cited by examiner

*Primary Examiner*—Hezron Williams
*Assistant Examiner*—Mark Shabman
(74) *Attorney, Agent, or Firm*—Michael Balconi-Lamica; Ranjeev Singh

(57) ABSTRACT

A liquid level sensor device (10) includes a liquid level sensor element (14), a capacitance-to-voltage converter (16), and a controller (18). The liquid level sensor element (14) comprises (i) at least two sets of N conductive electrodes (22) and (ii) M sense lines (S1-S7), where M is greater than or equal to N within each set of the at least two sets of conductive electrodes. Each of the M sense lines couples to select ones of the N conductive electrodes of the at least two sets of conductive electrodes to form a number of L sets of parallel coupled conductive electrodes, where L equals M. The capacitance-to-voltage converter (16) periodically measures a capacitance of the L sets of parallel coupled conductive electrodes for each of the M sense lines. The controller (18) establishes initial measured baseline capacitance values for each of the L sets of parallel coupled conductive electrodes and an initial liquid level height value. The controller (18) also detects transitions in the measured capacitance of the L sets of parallel coupled conductive electrodes. Responsive to the detected transitions corresponding to incremental changes in measured capacitance values, the controller updates the liquid level height value.

20 Claims, 5 Drawing Sheets

LIQUID LEVEL SENSING DEVICE AND METHOD

BACKGROUND

1. Field

This disclosure relates generally to sensing technologies, and more specifically, to liquid level sensing.

2. Related Art

Fluids, including both liquids and gases, are often stored in containers in both industrial and consumer applications. For example, in the industrial arena, fluids, such as petrochemical gases and liquids, chemical gases and liquids, and pharmaceutical mixtures or compounds, are often stored in containers. In many processes related to the manufacture of such gases and liquids, the level of such gases and liquids must be measured. Similarly, in the consumer arena, liquid levels are maintained in dish washers, washing machines, water heaters, and fuel tanks. Traditional liquid sensing techniques involve using a pressure sensor or a capacitive sensor. Pressure sensors are expensive and hence are not a good choice for many of these applications.

Traditional capacitive sensors also suffer from problems, such as low resolution in terms of detecting a change in the level of a liquid. In addition, traditional capacitive sensors require multiple pins associated with a controller to record any changes in the capacitance values, as the liquid level changes.

Accordingly, there is a need for an improved liquid level sensing method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
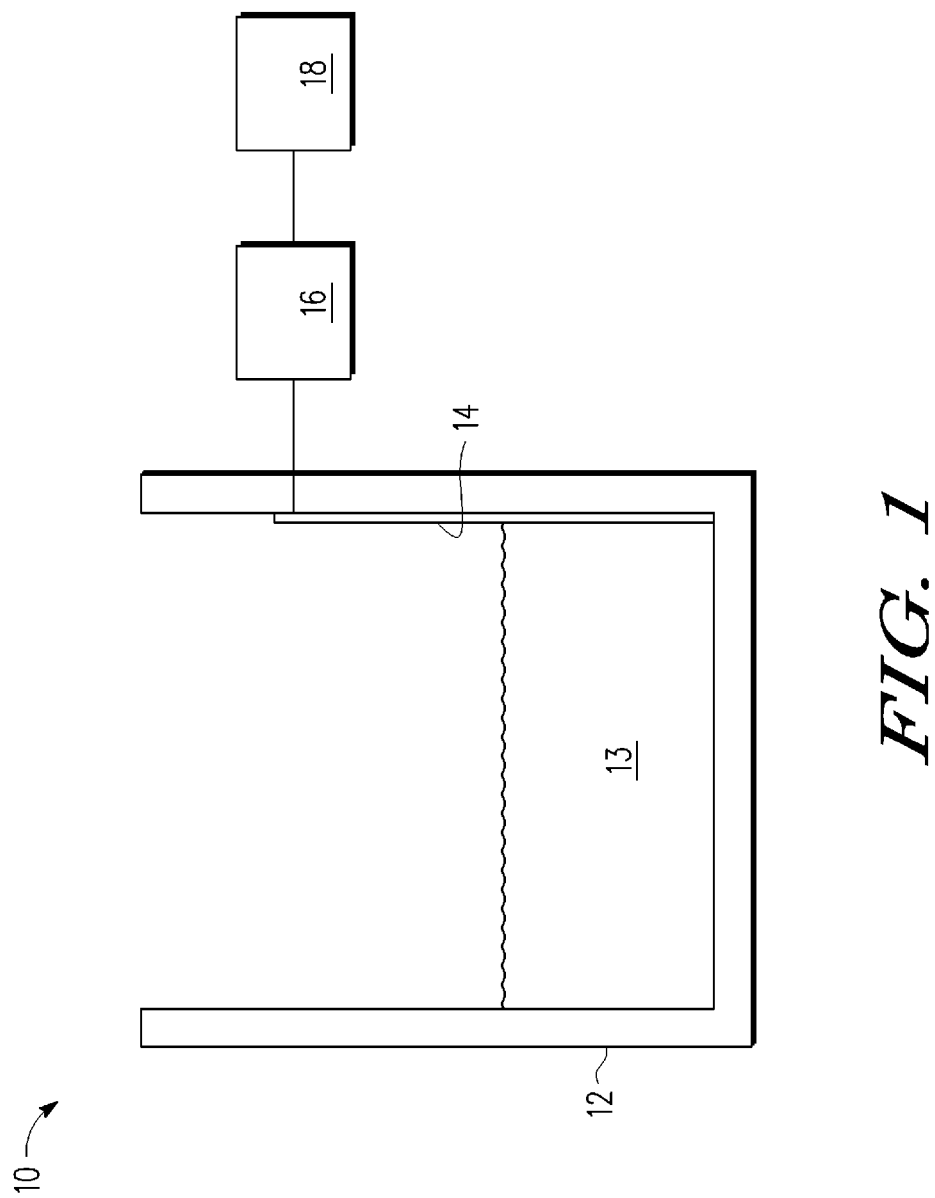
FIG. 1 is an illustrative view of an exemplary application for liquid level sensing.

Liquid level sensing methods and systems are described herein with respect to the use of capacitance sensing. By way of example, FIG. 1 shows an exemplary application 10 for liquid level sensing. Liquid level sensing application 10 includes a container 12 containing a liquid 13 and for which sensing the level of liquid 13 in container 12 is desired. As used herein, liquid can refer to one or both of a liquid form and a gaseous form of a fluid whose level is being sensed. A liquid level sensing element 14, according to the embodiments of the present disclosure, may be positioned on or attached to an inside wall of container 12. Alternatively and/or additionally, liquid sensing element 14 may also be attached to an outside wall of container 12. Alternatively and/or additionally liquid sensing element 14 may also be attached to an inside wall or an outside wall of a separate container or tube that is in fluid communication with container 12 in such a manner that it maintains approximately the same level of liquid as in container 12. Liquid sensing element 14 may be coupled with container 12 in any number of different ways depending upon the application environment. A capacitance to voltage converter 16 may be coupled to liquid level sensing element 14. Capacitance to voltage converter 16 may convert a capacitive value to a voltage value. Capacitance to voltage converter 16 may further be coupled to a controller 18. Controller 18 may provide the relevant control functionality, as described further below, and as associated with liquid level sensing for a given liquid level sensing implementation.

Figure 2:
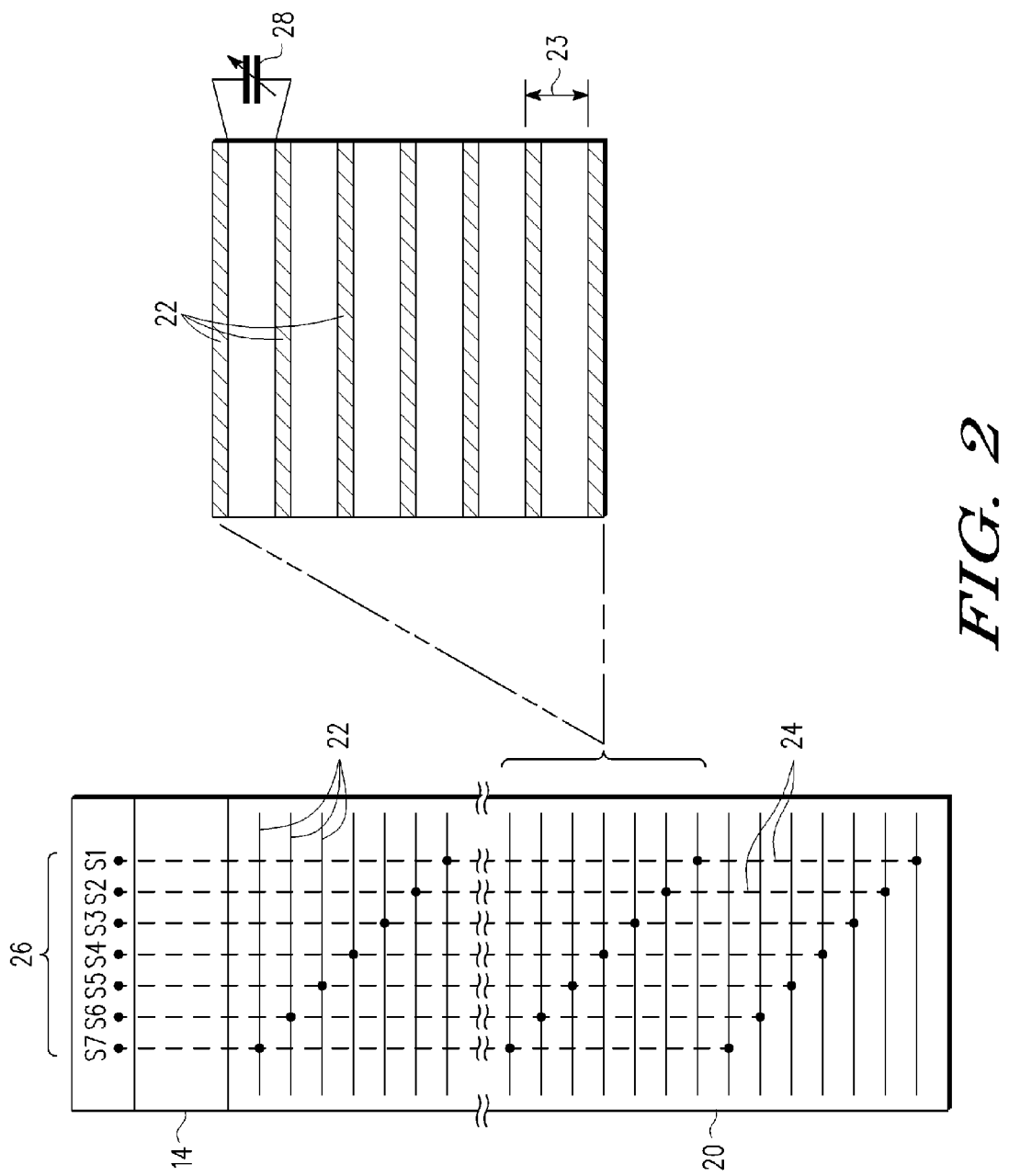
FIG. 2 is an illustrative view of an exemplary liquid level sensing element according to one embodiment of the present disclosure.

FIG. 2 shows an exemplary liquid level sensing element 14, according to one embodiment of the present disclosure. Liquid level sensing element 14 may comprise of a substrate 20 having electrodes 22 disposed upon a first surface of the substrate 20. Electrodes 22 may further be coupled to sensing lines 26 using routing conductors 24 and conductive vias. In one embodiment, the routing conductors 24 (indicated in phantom lines on FIG. 2) are disposed on a second surface of the substrate 20, wherein the second surface is on an opposite side of the first surface, and further wherein the conductive vias are each represented by the a dot shown at the intersection of a corresponding electrode and routing conductor.

Sensing lines 26 can comprise any number of sense lines according to the requirements of a given implementation. For example, in one embodiment, the number of sensing lines 26 comprises seven sense lines as indicated by designations S1, S2, S3, S4, S5, S6, and S7. In one embodiment, substrate 20 comprises any suitable printed circuit board material. For example, substrate 20 can comprise fiberglass, film or other suitable printed circuit board material. Electrodes 22 may be formed using any conductive material, including metals, such as copper or alloys thereof. In addition, electrodes 22 may also be covered using a film (not shown) having a low dielectric such that electrodes 22 are electrically and physically insulated from the liquid whose level is being sensed.

In one embodiment, electrodes 22 may be grouped in sets, such as each set may represent a set of capacitive values. In addition, substrate 20 can include a multiple number of groups of electrodes 22. FIG. 2 shows one such group in a magnified view. As shown in FIG. 2, in one example, the group includes seven (7) electrodes. Electrodes 22 are physically and uniformly spaced from one another other, for example, by a predetermined distance 23. The predetermined distance 23 between electrodes 22 corresponds to a resolution of liquid level sensing element 14. For example, if the predetermined distance between adjacent ones of the electrodes is 2 mm, then liquid sensing element 14 can detect changes in the level of liquid in 2 mm increments. Accordingly, electrodes 22 may be spaced at an appropriate distance from each other depending upon the required resolution for a given level sensing application. In addition, each pair of adjacent electrodes may have a certain capacitance between them, for example, as indicated by variable capacitance 28. Capacitance 28 can vary depending on a presence or absence of liquid proximate adjacent ones of the electrodes, and more particularly, whether a given pair of electrodes is (or pairs of electrodes are) immersed in the liquid or not.

According to one embodiment, a liquid level sensor device comprises a liquid level sensor element, a capacitance-to-voltage converter, and a controller. The liquid level sensor element 20 includes (i) at least two sets of N conductive electrodes 24 disposed parallel to one another in an array, where N represents an integer number of conductive electrodes in an individual set of conductive electrodes. The liquid level sensor element further includes (ii) M sense lines, where M represents an integer number of sense lines greater than or equal to the number of conductive electrodes N. In the embodiment shown in FIG. 2, the number of sense lines is seven. Each of the M sense lines is further coupled to select ones of the N conductive electrodes of the at least two sets of conductive electrodes to form a number of L sets of parallel coupled conductive electrodes, where L equals M. For example, in FIG. 2, a first set of parallel coupled conductive electrodes is connected to sense line S1, a second set of parallel coupled conductive electrodes is connected to sense line S2, etc. In the illustration of FIG. 2, there are seven sets of parallel coupled conductive electrodes.

According to one embodiment, the capacitance-to-voltage converter 16 of FIG. 1 is coupled to the M sense lines (S1, S2, . . . , S7) of the liquid level sensor element 20 for periodically measuring a capacitance of the L sets of parallel coupled conductive electrodes. In addition, the controller 18 of FIG. 1 is coupled to the capacitance-to-voltage converter 16, wherein the controller is configured to (a) establish (a)(i) initial measured baseline capacitance values for each of the L sets of parallel coupled conductive electrodes and (a)(ii) an initial liquid level height value. The controller 18 is further configured to (b) detect transitions in the measured capacitance of the L sets of parallel coupled conductive electrodes, as further discussed herein, for example, with reference to FIG. 7.

Figure 3:
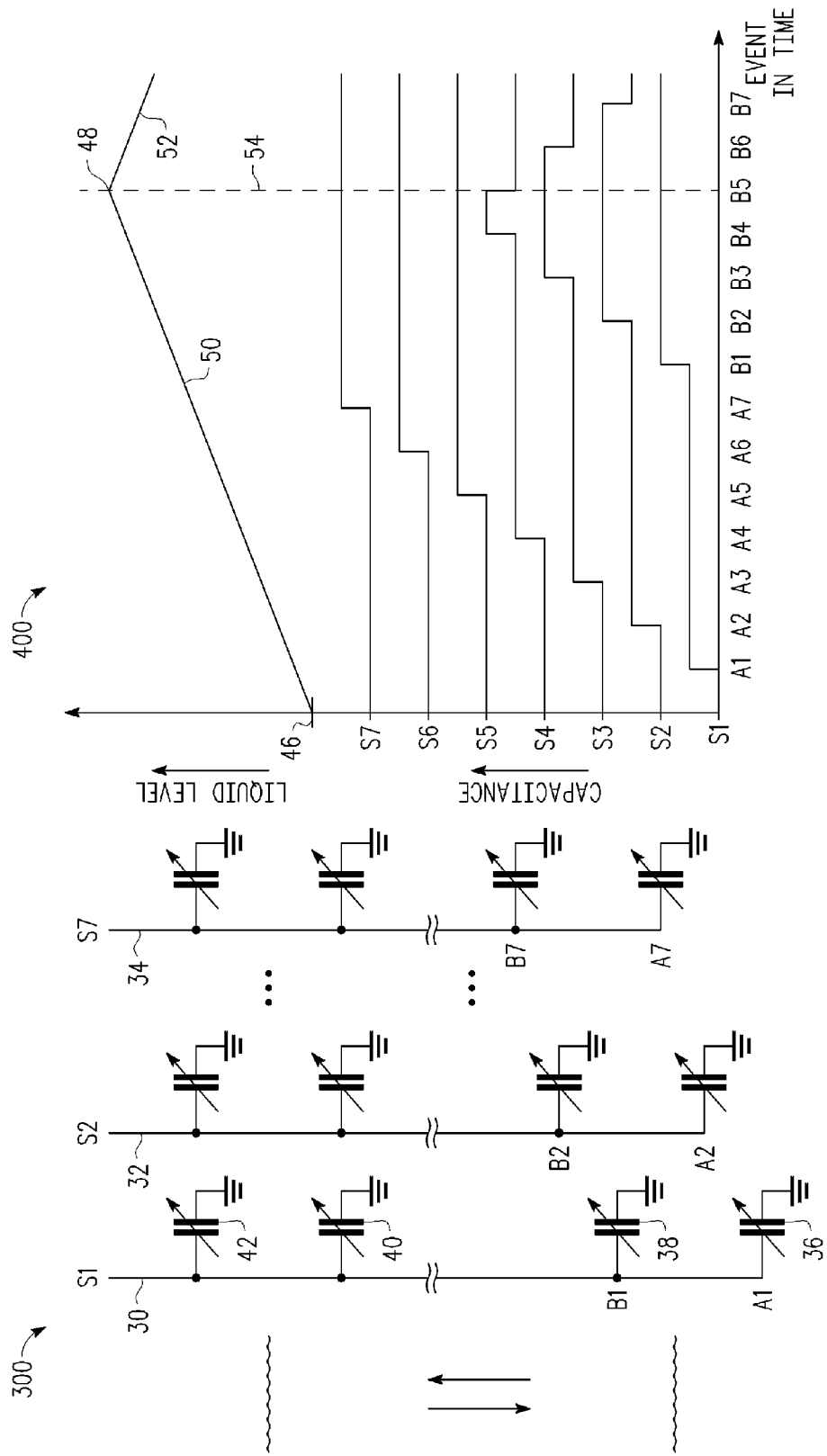
FIG. 3 is a schematic representation view of the exemplary liquid level sensing element of FIG. 2 and a graphical representation view of liquid level and associated capacitance changes sensed by the liquid sensing element of FIG. 2.

FIG. 3 shows a schematic representation 300 of the exemplary liquid level sensing element 14 of FIG. 2 and a graphical representation 400 of liquid level and associated capacitance changes sensed by the liquid sensing element 14 of FIG. 2. To illustrate the operation of liquid sensing with element 14, schematic representation 300 includes representations for portions of liquid sensing element 14. As shown, each sensing line 30, 32, and 34 (labeled as S1, S2, and S7 in FIG. 3 and further relating to corresponding routing conductors 24 of FIG. 2) may be represented as including a plurality of variable capacitive values, such as indicated by reference numerals 36, 38, 40, and 42 on sensing line 30. As the liquid level changes from a first level to a second level, wherein the first level is a different level that the second level, the capacitive values of the variable capacitance values associated with each respective sense line can change depending upon whether there has been any change in the liquid level affecting the respective ones of the electrodes. For example, in the context of a liquid in a washing machine, water level can rise or fall as indicated by bidirectional arrows 31 and 33, respectively, between a first level 35 to a second level 37, such as shown in FIG. 3. As the water level is rising, the level rises past one or more electrodes, e.g., electrodes A1-A7 of a first group of electrodes, electrodes B1-B7 of a second group of electrodes, and so on.

For purposes of explanation, consider an example of a washing machine in which liquid level in the washing machine changes from a first level, as indicated by reference numeral 46, to a second level, as indicated by reference numeral 48 of graphical representation 400. The graph illustrates liquid level rising, as indicated by reference numeral 52 and further illustrates liquid level falling, as indicated by reference numeral 52. The liquid level reached a peak between rising and falling, as indicated by the dashed line 54. To further understand the liquid level sensor according to the embodiments of the present disclosure, at liquid level 46, the liquid level has not yet reached electrode A1, as can be understood from graphical representation 400. As the liquid level continues to rise, the level reaches and passes corresponding ones of the electrodes A1, A2, A3, A4, A5, A6, and A7. Note that a corresponding change in capacitance is reflected in corresponding sense lines S1, S2, S3, S4, S5, S6 and S7. Upon the liquid level reaching and passing electrode B1 of sense line S1, an additional change in capacitance occurs on sense line S1, as can be understood from graphical representation 400. In this example, the liquid level continues to rise to the level indicated by reference numeral 48. As the liquid level continues rising up to level 48, additional change in capacitance occurs on sense lines S2, S3, and S4. Subsequently, the liquid level falls, as indicated by reference numeral 52, and corresponding changes in capacitance in sense lines occur. Note that for the decreasing liquid level 52, only changes in sense line S4, S3, and S2 are shown, for simplicity of illustration. Capacitance changes with respect to each sense line as the liquid level rises and falls between first and second levels operates in a similar manner as discussed in this example.

Figure 4:
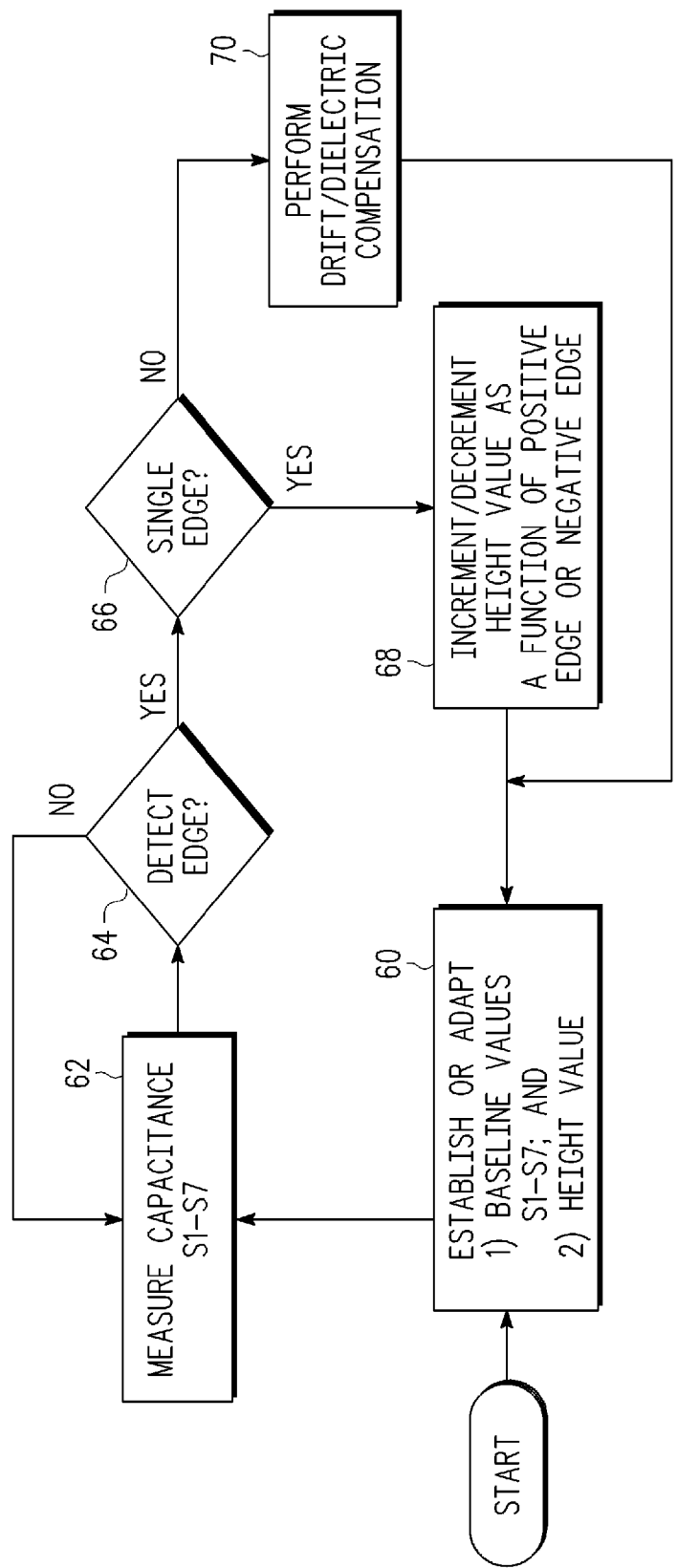
FIG. 4 is a diagrammatic flow chart view of an exemplary method for liquid level sensing according to one embodiment of the present disclosure.

Referring now to FIG. 4, the figure comprises a diagrammatic flow chart view of an exemplary method for liquid level sensing according to one embodiment of the present disclosure. In one embodiment, the method of implementing liquid level sensing comprises providing a liquid level sensor element. The liquid level sensor element includes (i) at least two sets of N conductive electrodes disposed parallel to one another in an array, where N represents an integer number of conductive electrodes in an individual set of conductive electrodes. The liquid level sensor element further includes (ii) M sense lines, where M represents an integer number of sense lines greater than or equal to the number of conductive electrodes N. Each of the M sense lines is coupled to select ones of the N conductive electrodes of the at least two matching sets of conductive electrodes to form a number of L sets of parallel coupled conductive electrodes, where L equals M.

The method further includes periodically measuring a capacitance of the L sets of parallel coupled conductive electrodes via a capacitance-to-voltage converter coupled to the M sense lines of the liquid level sensor element, and coupling a controller to the capacitance-to-voltage converter. The controller is configured to (a) establish (a)(i) initial measured baseline capacitance values for each of the L sets of parallel coupled conductive electrodes and (a)(ii) an initial liquid level height value, and further configured to (b) detect transitions in the measured capacitance of the L sets of parallel coupled conductive electrodes.

The step of establishing or adapting 1) baseline values for each sense line (e.g., S1-S7) and 2) a height value for liquid level being sensed is indicated by block 60 of the flow chart in FIG. 4. In block 62, the method includes measuring a capacitance of each of the sense lines (e.g., S1-S7). In block 64, the method queries whether any edges in capacitance measurements are detected. If no edges are detected, then the process returns to block 62 and measuring the capacitance of the sense lines is repeated. If in block 64, an edge in capacitance measurement is detected, then the method proceeds to block 66. In block 66, the method queries whether the detected edge comprises a single edge. If the detected edge comprises a single edge, corresponding to an incremental change in capacitance, then the method proceeds to block 68. In particular, if the detected transitions comprise single edge transitions, then the transitions correspond to incremental changes in capacitance of one or more of the L sets of parallel coupled conductive electrodes of the at least two sets of conductive electrodes in response to a physical change in a level of liquid with respect to the liquid level sensor element.

In block 68, the previous height value is incremented or decremented as a function of a positive edge or negative edge, respectively, reflecting either a rise in liquid level height or a decrease in liquid level height. Subsequent to incrementing or decrementing the height value in block 68, the method proceeds again to block 60 and establishes or adapts 1) baseline values of the sense lines and 2) height values as previously discussed.

Referring back to block 66, if the detected edge does not comprise a single edge, then the detected edges correspond to non-incremental changes. Upon the detection of non-incremental changes, the method then proceeds to block 70. In block 70, the method performs one of a drift and/or dielectric compensation. In particular, the detected transitions correspond to non-incremental changes in capacitance of one or more of the L sets of parallel coupled conductive electrodes of the at least two sets of conductive electrodes as a result of either 1) a change in dielectric constant of the liquid for which the liquid level is being sensed, or 2) a drift in measured capacitance values of one or more of the L sets of parallel coupled conductive electrodes of the at least two sets of conductive electrodes. Upon performing an appropriate drift and/or dielectric compensation, the method proceeds again to block 60 and establishes or adapts 1) baseline values of the sense lines and 2) height values as previously discussed.

According to the embodiments of the present disclosure, the controller 18 is configured for performing a number of processes as follows. Responsive to the detected transitions corresponding to incremental changes in measured capacitance values, the controller is configured to update the liquid level height value as a function of a number of the incremental changes in measured capacitance values. In addition, responsive to the detected transitions corresponding to non-incremental changes in measured capacitance values that correspond to change in dielectric constant of the liquid, the controller is further configured to perform a capacitance measurement compensation as a function of the change in dielectric constant of the liquid. Furthermore, responsive to the detected transitions corresponding to non-incremental changes in measured capacitance values that correspond to drift in measured capacitance values, the controller is still further configured to perform a capacitance measurement compensation by adapting the initial measured baseline capacitance values for the L sets of parallel coupled conductive electrodes as a function of the drift.

Further according to the embodiments of the present disclosure, the capacitance-to-voltage converter 16 is configured to measure the capacitance of the L sets of parallel coupled conductive electrodes of the at least two sets of conductive electrodes in a predetermined order. In one embodiment, the predetermined order is from a sense line of lowermost matched conductive electrodes to a sense line of uppermost matched conductive electrodes of the L sets of parallel coupled conductive electrodes of the at least two sets of conductive electrodes.

According to one embodiment, a method of implementing liquid level sensing comprises providing a liquid level sensor element, periodically measuring a capacitance of conductive electrodes of the sensor element via a capacitance-to-voltage converter, and coupling a controller to the capacitance-to-voltage converter. The liquid level sensor element includes (i) at least two sets of N conductive electrodes disposed parallel to one another in an array, where N represents an integer number of conductive electrodes in an individual set of conductive electrodes. The liquid level sensor element further includes (ii) M sense lines, where M represents an integer number of sense lines greater than or equal to the number of conductive electrodes N. Each of the M sense lines couples to select ones of the N conductive electrodes of the at least two matching sets of conductive electrodes to form a number of L sets of parallel coupled conductive electrodes. In one embodiment, the number of L sets of parallel coupled conductive electrodes equals the number of M sense lines.

Periodically measuring a capacitance of the conductive electrodes of the sensor element via the capacitance-to-voltage converter 16 includes measuring the capacitance of the L sets of parallel coupled conductive electrodes 22 coupled to the M sense lines (S1, S2, . . . S7) of the liquid level sensor element 20. In addition to coupling the controller 18 to the capacitance-to-voltage converter 16, the controller 18 is configured to (a) establish (a)(i) initial measured baseline capacitance values for each of the L sets of parallel coupled conductive electrodes and (a)(ii) an initial liquid level height value. Controller 18 is further configured to (b) detect transitions in the measured capacitance of the L sets of parallel coupled conductive electrodes.

In one embodiment, the detected transitions correspond to at least one selected from the group consisting of incremental changes and non-incremental changes in capacitance. Incremental changes represent incremental changes in capacitance of one or more of the L sets of parallel coupled conductive electrodes of the at least two sets of conductive electrodes in response to a physical change in a level of liquid 13 with respect to the liquid level sensor element 14. Non-incremental changes represent non-incremental changes in capacitance of one or more of the L sets of parallel coupled conductive electrodes of the at least two sets of conductive electrodes in response to one of a dielectric constant change and/or a measurement drift. One example of a dielectric constant change can include a change in dielectric constant of the liquid for which the liquid level is being sensed. For example, a soap detergent added to the water of a laundry machine has the ability to change the dielectric constant of the liquid contained in the laundry machine. The method of the present disclosure takes into account that the properties of the liquid for which liquid level is being monitored are subject to change. One example of measurement drift can include a drift in measured capacitance values of one or more of the L sets of parallel coupled conductive electrodes of the at least two sets of conductive electrodes.

The method further includes wherein responsive to the detected transitions corresponding to incremental changes in measured capacitance values, the controller updates the liquid level height value as a function of a number of the incremental changes in measured capacitance values. In addition, responsive to the detected transitions corresponding to non-incremental changes in measured capacitance values that correspond to change in dielectric constant of the liquid, the controller performs a capacitance measurement compensation as a function of the change in dielectric constant of the liquid. Furthermore, responsive to the detected transitions corresponding to non-incremental changes in measured capacitance values that correspond to drift in measured capacitance values, the controller performs a capacitance measurement compensation by adapting the initial measured baseline capacitance values for the L sets of parallel coupled conductive electrodes as a function of the drift.

In another embodiment of the method, the capacitance-to-voltage converter operates to measure the capacitance of the L sets of parallel coupled conductive electrodes of the at least two sets of conductive electrodes in a predetermined order. The predetermined order is from a sense line of lowermost matched conductive electrodes to a sense line of uppermost matched conductive electrodes of the L sets of parallel coupled conductive electrodes of the at least two sets of conductive electrodes.

Figure 5:
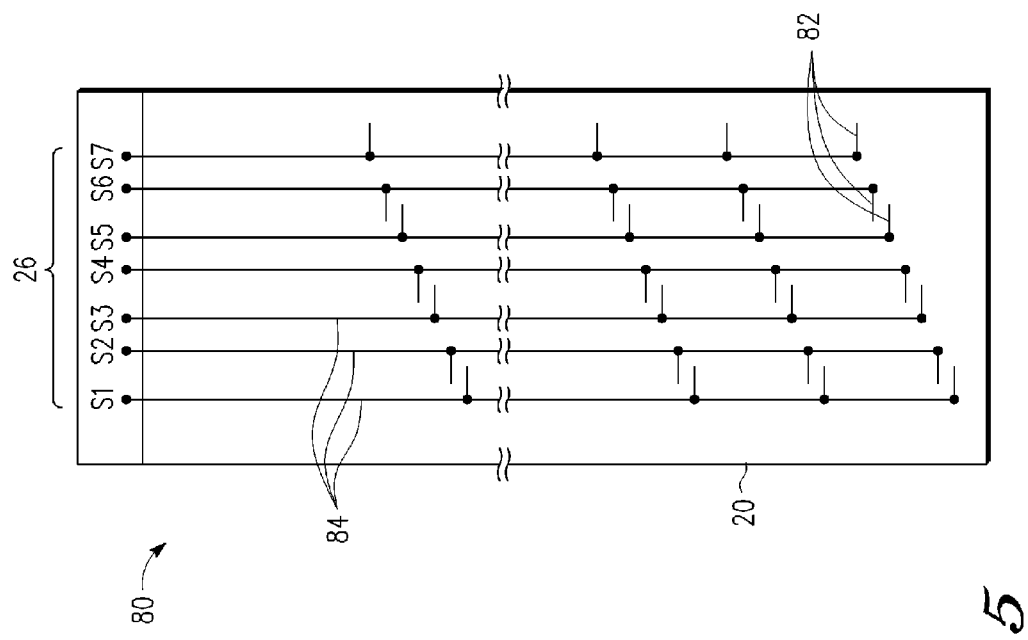
FIG. 5 is an illustrative view of an exemplary liquid level sensing element according to another embodiment of the present disclosure.

FIG. 5 is an illustrative view of an exemplary liquid level sensing element 80 according to another embodiment of the present disclosure. Liquid level sensing element 80 is similar to sensing element 20 of FIG. 2, with the following differences. Liquid level sensing element 80 comprises a substrate 20 having electrodes 82 disposed upon a single surface of the substrate 20. Electrodes 82 may further be coupled to sensing lines 26 using routing conductors 84. In this embodiment, the routing conductors 84 (indicated in solid lines on FIG. 5) are disposed on the same surface of the substrate 20 as the electrodes 82, wherein wherein a dot is shown at the intersection of a corresponding electrode and routing conductor.

By now it should be appreciated that there has been provided a liquid level sensor device comprising: a liquid level sensor element, the liquid level sensor element including (i) at least two sets of N conductive electrodes disposed parallel to one another in an array, where N represents an integer number of conductive electrodes in an individual set of conductive electrodes, the liquid level sensor element further including (ii) M sense lines, where M represents an integer number of sense lines greater than or equal to the number of conductive electrodes N, each of the M sense lines further being coupled to select ones of the N conductive electrodes of the at least two sets of conductive electrodes to form a number of L sets of parallel coupled conductive electrodes, where L equals M; a capacitance-to-voltage converter coupled to the M sense lines of the liquid level sensor element for periodically measuring a capacitance of the L sets of parallel coupled conductive electrodes; and a controller coupled to the capacitance-to-voltage converter, the controller being configured to (a) establish (a)(i) initial measured baseline capacitance values for each of the L sets of parallel coupled conductive electrodes and (a)(ii) an initial liquid level height value, the controller further configured to (b) detect transitions in the measured capacitance of the L sets of parallel coupled conductive electrodes.

The detected transitions can correspond to one or more of (b)(i) incremental changes in capacitance of one or more of the L sets of parallel coupled conductive electrodes of the at least two sets of conductive electrodes in response to a physical change in a level of liquid with respect to the liquid level sensor element, and (b)(ii) non-incremental changes in capacitance of one or more of the L sets of parallel coupled conductive electrodes of the at least two sets of conductive electrodes in response to one selected from (b)(ii)(1) a change in dielectric constant of the liquid for which the liquid level is being sensed, and (b)(ii)(2) a drift in measured capacitance values of one or more of the L sets of parallel coupled conductive electrodes of the at least two sets of conductive electrodes.

In addition, responsive to the detected transitions corresponding to incremental changes in measured capacitance values, the controller is further configured to update the liquid level height value as a function of a number of the incremental changes in measured capacitance values. Responsive to detection of a positive transition corresponding to an incremental change, the controller updates the liquid level height value by incrementing the liquid level height value. Responsive to detection of a negative transition corresponding to an incremental change, the controller updates the liquid level height value by decrementing the liquid level height value.

Furthermore, responsive to the detected transitions corresponding to non-incremental changes in measured capacitance values that correspond to change in dielectric constant of the liquid, the controller is further configured to perform a capacitance measurement compensation as a function of the change in dielectric constant of the liquid. Furthermore, responsive to the detected transitions corresponding to non-incremental changes in measured capacitance values that correspond to drift in measured capacitance values, the controller is further configured to perform a capacitance measurement compensation by adapting the initial measured baseline capacitance values for the L sets of parallel coupled conductive electrodes as a function of the drift.

In a further embodiment, the capacitance-to-voltage converter operates to measure the capacitance of the L sets of parallel coupled conductive electrodes of the at least two sets of conductive electrodes in a predetermined order. In addition, the predetermined order can include beginning from a sense line of lowermost conductive electrodes and continuing on to a sense line of uppermost conductive electrodes of the L sets of parallel coupled conductive electrodes.

In another embodiment, the conductive electrodes are separated from one another by a predetermined spacing R, where R represents a resolution capability of the liquid level sensor element. In addition, adjacent electrode pairs of the at least two sets of N conductive electrodes represent a variable capacitance as between corresponding electrodes for use in detecting the transitions in measured capacitance as a function of the liquid for which liquid level is being sensed. Furthermore, in one embodiment, the variable capacitance as between corresponding electrodes can comprise a value in the pico-farad (pF) range. Still further, in another embodiment, the resolution capability can comprise detecting changes in liquid level height on the order of plus or minus (+/−) 1-2 mm.

In one embodiment, the conductive electrodes and sense lines can comprise one or more of (i) conductive electrodes and sense lines disposed on a single side of a substrate, (ii) conductive electrodes and the sense lines disposed on more than one side of a substrate, and (iii) conductive electrodes and sense lines formed within a substrate. In addition, a dielectric layer is provided, as may be required for a given implementation, for electrically isolating the conductive electrodes and the sense lines from the liquid for which liquid level is being sensed.

In another embodiment, the liquid level sensor device is implemented in a system employing liquid level height sensing, for example, a fuel system. In yet another embodiment, the liquid level sensor device is implemented in a system apparatus employing liquid level height sensing, for example, wherein the system apparatus comprises a consumer appliance. Examples of consumer appliances can include a washing machine, dishwasher, or similar consumer appliances which make use of liquids.

According to one embodiment, a liquid level sensor device comprises a liquid level sensor element, a capacitance-to-voltage converter, and a controller. The liquid level sensor element includes (i) at least two sets of N conductive electrodes disposed parallel to one another in an array, where N represents an integer number of conductive electrodes in an individual set of conductive electrodes. The liquid level sensor element further includes (ii) M sense lines, where M represents an integer number of sense lines greater than or equal to the number of conductive electrodes N, each of the M sense lines further being coupled to select ones of the N conductive electrodes of the at least two sets of conductive electrodes to form a number of L sets of parallel coupled conductive electrodes, where L equals M. In addition, the conductive electrodes and sense lines can comprise one or more of (a) conductive electrodes and sense lines disposed on a single side of a substrate, (b) conductive electrodes and the sense lines disposed on more than one side of a substrate, and (c) conductive electrodes and sense lines formed within a substrate.

The capacitance-to-voltage converter couples to the M sense lines of the liquid level sensor element. The capacitance-to-voltage converter is configured to periodically measure a capacitance of the L sets of parallel coupled conductive electrodes. In addition, the controller couples to the capacitance-to-voltage converter. The controller is configured to (a) establish (a)(i) initial measured baseline capacitance values for each of the L sets of parallel coupled conductive electrodes and (a)(ii) an initial liquid level height value, the controller further configured to (b) detect transitions in the measured capacitance of the L sets of parallel coupled conductive electrodes. The detected transitions correspond to at least one selected from the group consisting of (b)(i) incremental changes in capacitance of one or more of the L sets of parallel coupled conductive electrodes of the at least two sets of conductive electrodes in response to a physical change in a level of liquid with respect to the liquid level sensor element and (b)(ii) non-incremental changes in capacitance of one or more of the L sets of parallel coupled conductive electrodes of the at least two sets of conductive electrodes. The non-incremental changes can include (1) a change in dielectric constant of the liquid for which the liquid level is being sensed and (2) a drift in measured capacitance.

Responsive to the detected transitions corresponding to incremental changes in measured capacitance values, the controller is further configured to update the liquid level height value as a function of a number of the incremental changes in measured capacitance values. Responsive to the detected edge transitions corresponding to non-incremental changes in measured capacitance values that correspond to change in dielectric constant of the liquid, the controller is further configured to perform a capacitance measurement compensation as a function of the change in dielectric constant of the liquid. Responsive to the detected edge transitions corresponding to non-incremental changes in measured capacitance values that correspond to a drift in measured capacitance values of one or more of the L sets of parallel coupled conductive electrodes of the at least two sets of conductive electrodes, the controller is further configured to perform a capacitance measurement compensation by adapting the initial measured baseline capacitance values (and any subsequent re-initialized measured baseline capacitance values) for the L sets of parallel coupled conductive electrodes as a function of the drift.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A liquid level sensor device comprising:
   a liquid level sensor element, the liquid level sensor element including (i) at least two sets of N conductive electrodes disposed parallel to one another in an array, where N represents an integer number of conductive electrodes in an individual set of conductive electrodes, the liquid level sensor element further including (ii) M sense lines, where M represents an integer number of sense lines greater than or equal to the number of conductive electrodes N, each of the M sense lines further being coupled to select ones of the N conductive electrodes of the at least two sets of conductive electrodes to form a number of L sets of parallel coupled conductive electrodes, where L equals M;
   a capacitance-to-voltage converter coupled to the M sense lines of the liquid level sensor element for periodically measuring a capacitance of the L sets of parallel coupled conductive electrodes; and
   a controller coupled to the capacitance-to-voltage converter, the controller being configured to (a) establish (a)(i) initial measured baseline capacitance values for each of the L sets of parallel coupled conductive electrodes and (a)(ii) an initial liquid level height value, the controller further configured to (b) detect transitions in the measured capacitance of the L sets of parallel coupled conductive electrodes.

2. The device of claim 1, wherein the detected transitions correspond to at least one selected from the group consisting of
   (b)(i) incremental changes in capacitance of one or more of the L sets of parallel coupled conductive electrodes of the at least two sets of conductive electrodes in response to a physical change in a level of liquid with respect to the liquid level sensor element, and
   (b)(ii) non-incremental changes in capacitance of one or more of the L sets of parallel coupled conductive electrodes of the at least two sets of conductive electrodes in response to one selected from
      (b)(ii)(1) a change in dielectric constant of the liquid for which the liquid level is being sensed, and
      (b)(ii)(2) a drift in measured capacitance values of one or more of the L sets of parallel coupled conductive electrodes of the at least two sets of conductive electrodes.

3. The device of claim 2, wherein responsive to the detected transitions corresponding to incremental changes in measured capacitance values, the controller is further configured to update the liquid level height value as a function of a number of the incremental changes in measured capacitance values.

4. The device of claim 3, further wherein responsive to detection of a positive transition corresponding to an incremental change, the controller updates the liquid level height value by incrementing the liquid level height value, and
   wherein responsive to detection of a negative transition corresponding to an incremental change, the controller updates the liquid level height value by decrementing the liquid level height value.

5. The device of claim 2, wherein responsive to the detected transitions corresponding to non-incremental changes in measured capacitance values that correspond to change in dielectric constant of the liquid, the controller is further configured to perform a capacitance measurement compensation as a function of the change in dielectric constant of the liquid, and
   wherein responsive to the detected transitions corresponding to non-incremental changes in measured capacitance values that correspond to drift in measured capacitance values, the controller is further configured to perform a capacitance measurement compensation by adapting the initial measured baseline capacitance values for the L sets of parallel coupled conductive electrodes as a function of the drift.

6. The device of claim 1, wherein the capacitance-to-voltage converter operates to measure the capacitance of the L sets of parallel coupled conductive electrodes of the at least two sets of conductive electrodes in a predetermined order.

7. The device of claim 6, wherein the predetermined order is from a sense line of lowermost conductive electrodes to a sense line of uppermost conductive electrodes of the L sets of parallel coupled conductive electrodes.

8. The device of claim 1, wherein the conductive electrodes are separated from one another by a predetermined spacing R, where R represents a resolution capability of the liquid level sensor element.

9. The device of claim 8, further wherein adjacent electrode pairs of the at least two sets of N conductive electrodes represent a variable capacitance as between corresponding electrodes for use in detecting the transitions in measured capacitance as a function of the liquid for which liquid level is being sensed.

10. The device of claim 9, further wherein the variable capacitance as between corresponding electrodes comprises a value in the pico-farad (pF) range.

11. The device of claim 8, further wherein the resolution capability comprises detecting changes in liquid level height on the order of plus or minus (+/−) 1–2 mm.

12. The device of claim 1, wherein the conductive electrodes and sense lines comprise one selected from the group consisting of (i) conductive electrodes and sense lines disposed on a single side of a substrate, (ii) conductive electrodes and the sense lines disposed on more than one side of a substrate, and (iii) conductive electrodes and sense lines formed within a substrate.

13. The device of claim 12, further comprising:
   a dielectric layer for electrically isolating the conductive electrodes and the sense lines from the liquid for which liquid level is being sensed.

14. The device of claim 1, wherein the liquid level sensor device is implemented in one selected from the group consisting of a system employing liquid level height sensing and system apparatus employing liquid level height sensing.

15. The device of claim 14, further wherein the system comprises a fuel system and wherein the system apparatus comprises a consumer appliance that includes one selected from the group consisting of a washing machine and a dishwasher.

16. A liquid level sensor device comprising:
   a liquid level sensor element, the liquid level sensor element including (i) at least two sets of N conductive electrodes disposed parallel to one another in an array, where N represents an integer number of conductive electrodes in an individual set of conductive electrodes, the liquid level sensor element further including (ii) M sense lines, where M represents an integer number of sense lines greater than or equal to the number of conductive electrodes N, each of the M sense lines further being coupled to select ones of the N conductive electrodes of the at least two sets of conductive electrodes to form a number of L sets of parallel coupled conductive electrodes, where L equals M, further wherein the conductive electrodes and sense lines comprise one selected from the group consisting of (a) conductive electrodes and sense lines disposed on a single side of a substrate, (b) conductive electrodes and the sense lines disposed on more than one side of a substrate, and (c) conductive electrodes and sense lines formed within a substrate;
   a capacitance-to-voltage converter coupled to the M sense lines of the liquid level sensor element for periodically measuring a capacitance of the L sets of parallel coupled conductive electrodes; and
   a controller coupled to the capacitance-to-voltage converter, the controller being configured to (a) establish (a)(i) initial measured baseline capacitance values for each of the L sets of parallel coupled conductive electrodes and (a)(ii) an initial liquid level height value, the controller further configured to (b) detect transitions in the measured capacitance of the L sets of parallel coupled conductive electrodes, wherein the detected transitions correspond to at least one selected from the group consisting of
      (b)(i) incremental changes in capacitance of one or more of the L sets of parallel coupled conductive electrodes of the at least two sets of conductive electrodes in response to a physical change in a level of liquid with respect to the liquid level sensor element, wherein responsive to the detected transitions corresponding to incremental changes in measured capacitance values, the controller is further configured to update the liquid level height value as a function of a number of the incremental changes in measured capacitance values, and (b)(ii) non-incremental changes in capacitance of one or more of the L sets of parallel coupled conductive electrodes of the at least two sets of conductive electrodes in response to one selected from (b)(ii)(1) a change in dielectric constant of the liquid for which the liquid level is being sensed, wherein responsive to the detected edge transitions corresponding to non-incremental changes in measured capacitance values that correspond to change in dielectric constant of the liquid, the controller is further configured to perform a capacitance measurement compensation as a function of the change in dielectric constant of the liquid, and (b)(ii)(2) a drift in measured capacitance values of one or more of the L sets of parallel coupled conductive electrodes of the at least two sets of conductive electrodes, wherein responsive to the detected transitions corresponding to non-incremental changes in measured capacitance values that correspond to drift in measured capacitance values, the controller is further configured to perform a capacitance measurement compensation by adapting the initial measured baseline capacitance values for the L sets of parallel coupled conductive electrodes as a function of the drift.

17. A method of implementing liquid level sensing comprising:

providing a liquid level sensor element, the liquid level sensor element including (i) at least two sets of N conductive electrodes disposed parallel to one another in an array, where N represents an integer number of conductive electrodes in an individual set of conductive electrodes, the liquid level sensor element further including (ii) M sense lines, where M represents an integer number of sense lines greater than or equal to the number of conductive electrodes N, each of the M sense lines further being coupled to select ones of the N conductive electrodes of the at least two matching sets of conductive electrodes to form a number of L sets of parallel coupled conductive electrodes, where L equals M;

periodically measuring a capacitance of the L sets of parallel coupled conductive electrodes via a capacitance-to-voltage converter coupled to the M sense lines of the liquid level sensor element; and coupling a controller to the capacitance-to-voltage converter, the controller being configured to (a) establish (a)(i) initial measured baseline capacitance values for each of the L sets of parallel coupled conductive electrodes and (a)(ii) an initial liquid level height value, the controller further configured to (b) detect transitions in the measured capacitance of the L sets of parallel coupled conductive electrodes.

18. The method of claim 17, wherein the detected transitions correspond to at least one selected from the group consisting of (b)(i) incremental changes in capacitance of one or more of the L sets of parallel coupled conductive electrodes of the at least two sets of conductive electrodes in response to a physical change in a level of liquid with respect to the liquid level sensor element, and (b)(ii) non-incremental changes in capacitance of one or more of the L sets of parallel coupled conductive electrodes of the at least two sets of conductive electrodes in response to one selected from (b)(ii)(1) a change in dielectric constant of the liquid for which the liquid level is being sensed, and (b)(ii)(2) a drift in measured capacitance values of one or more of the L sets of parallel coupled conductive electrodes of the at least two sets of conductive electrodes.

19. The method of claim 18, further wherein responsive to the detected transitions corresponding to incremental changes in measured capacitance values, the controller is further configured to update the liquid level height value as a function of a number of the incremental changes in measured capacitance values, and responsive to the detected transitions corresponding to non-incremental changes in measured capacitance values that correspond to change in dielectric constant of the liquid, the controller is further configured to perform a capacitance measurement compensation as a function of the change in dielectric constant of the liquid, and responsive to the detected transitions corresponding to non-incremental changes in measured capacitance values that correspond to drift in measured capacitance values, the controller is further configured to perform a capacitance measurement compensation by adapting the initial measured baseline capacitance values for the L sets of parallel coupled conductive electrodes as a function of the drift.

20. The method of claim 17, wherein the capacitance-to-voltage converter operates to measure the capacitance of the L sets of parallel coupled conductive electrodes of the at least two sets of conductive electrodes in a predetermined order, and wherein the predetermined order is from a sense line of lowermost matched conductive electrodes to a sense line of uppermost matched conductive electrodes of the L sets of parallel coupled conductive electrodes of the at least two sets of conductive electrodes.

* * * * *